United States Patent Office 2,786,081
Patented Mar. 19, 1957

2,786,081
ACETAL CONDENSATION PRODUCTS

Bernard H. Kress, Ambler, Pa., assignor to Quaker Chemical Products Corporation, Conshohocken, Pa., a corporation of Pennsylvania No Drawing. Application January 8, 1954,
Serial No. 403,056

7 Claims. (Cl. 260—615)

This invention relates to acetal condensation products. More specifically, this invention relates to polymeric condensation products of polyalkylene glycols and aldehydes. These condensation products are of particular value in textile applications and are also useful as plasticizers in plastics and film-forming materials.

In preparing the polymeric acetal condensation products according to the present invention, diethylene glycol and paraformaldehyde, for example, are heated in the presence of a strong acid catalyst and an azeotroping liquid, such as toluene, to facilitate removal of water and aid the condensation. The condensation product thus obtained is a somewhat viscous liquid (25° C.), completely soluble in water and in many organic solvents, such as toluene, benzene, xylene, etc. It is also completely miscible in water. It is completely stable under neutral or basic conditions, as are its aqueous solutions. The odor associated with the compound is faint and ethereal.

The following examples are illustrative embodiments of my invention. The parts given are by weight.

Example 1

| | Parts |
|---|---|
| Diethylene glycol | 106 |
| Paraformaldehyde (91%) | 33 |
| Sulfuric acid (99%) | 0.1 |
| Toluene | 20 |

These compounds were heated under reflux with a moisture trap inserted between the flask and the reflux condenser. After 18 parts of water of reaction were withdrawn from the reaction mixture, it was heated in vacuo with agitation to remove toluene. Under conditions of 20 mm. of Hg and at temperatures up to 150° C. no volatile organic condensation product was obtained. The resulting product was then neutralized with dilute NaOH solution to a pH of 7. The product was completely soluble in water and in toluene. It had a faint ethereal odor and was somewhat viscous. It was free of formaldehyde odor under normal room conditions. The product had a molecular weight of 480 (Rast) and a hydroxyl equivalent of 220 which indicates it has a linear polymeric structure. It had a specific gravity of 1.155 at 94° F. The refractive index was $N_D^{30}=1.462$. The molecular weight and hydroxyl equivalent of the condensation product of this example indicate that it possesses a polymeric structure, containing an average of four diethylene glycol units, as shown in the following formula:

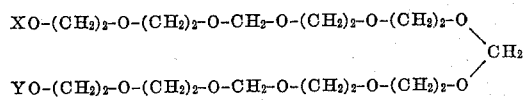

where X and Y may be either H or —CH$_2$OH.

It will be apparent that the foregoing polymeric acetal condensation product contains at least two dioxyalkylene radicals derived from the diethylene glycol and at least two alkylidene radicals derived from the formaldehyde.

Example 2

The reactants described in Example 1 were treated in the same manner except that the acid catalyst was neutralized before vacuum treatment to remove toluene and traces of moisture. The resulting product was similar to that obtained in Example 1.

Example 3

| | Parts |
|---|---|
| Diethylene glycol | 85 |
| Dipropylene glycol | 27 |
| Paraformaldehyde (91%) | 33 |
| Toluene | 20 |
| Sulfuric acid (99%) | 0.1 |

These reactants were treated as in Example 1. The resulting product was a viscous liquid which formed a crystalline mass below 0° C. The product was soluble in water or toluene and had a faint ethereal odor.

Example 4

| | Parts |
|---|---|
| Diethylene glycol | 80 |
| Sorbitol—crystalline | 32 |
| Paraformaldehyde (91%) | 30 |
| Toluene | 20 |
| Sulfuric acid (99%) | .1 |

These reactants were treated as in Example 1. The product was a crystalline mass at room temperature, soluble in toluene and in water, and with virtually no odor.

Example 5

| | Parts |
|---|---|
| Diethylene glycol | 106 |
| Paraformaldehyde (91%) | 52 |
| Glyoxal (30%) | 39 |
| Toluene | 20 |
| Sulfuric acid (99%) | 0.1 |

These components were reacted as in Example 1. The product was a somewhat viscous yellow liquid with a faint ethereal odor. The product was soluble in water and in toluene.

Polymeric condensation products may also be made starting with dipropylene glycol, dibutylene glycols and higher dialkylene glycols, polyalkylene glycols, mixtures thereof, or their mixtures with diethylene glycol which are reactive with formaldehyde or other aldehydes to form water-soluble products or products which are dispersible in water, either alone or with the aid of appropriate adjuvants. Polyalkylene glycols, such as triethylene glycol, tetraethylene glycol, tripropylene glycol and the like, in which the alkylene groups contain from 2 to 3 carbon atoms in a straight chain, may also be used, either alone or in admixture with the aforementioned dialkylene glycols. Likewise polyols, such as glycerine, pentaerythritol and sorbitol, which are aliphatic polyhydric alcohols having 3 to 6 carbon atoms and 3 to 6 hydroxyl groups, may be added to the alkylene glycols in amounts up to about 50 mol. percent of the glycols for reaction with the aldehyde for forming water-soluble or water-dispersible products. Instead of the paraformaldehyde of the above examples, trioxane, methylal, aqueous formalin and similar formaldehyde-generating compounds may be used. Instead of formaldehyde, other reactive aldehydes, such as acetaldehyde, propanal, butanal, glyoxal, and other dialdehydes, containing not more than 8 carbon atoms in the monomeric form, and mixtures thereof, may be used in forming water-soluble or water-dispersible condensation products with the alkylene glycols. The term "alkylene" is understood to include a doubly unsaturated aliphatic radical containing a substituted or unsubstituted straight chain possessing from two to four carbon atoms in the chain and having its unsatisfied valences on either adjacent or separated carbon atoms.

If desired, the polymeric chains of the compounds of my invention may be terminated, either in whole or in part, by means of an alkyl radical possessing not more than 8 carbon atoms. The alkyl radical may be introduced in any suitable manner. I may, for example, co-react an aldehyde and a glycol in the presence of a minor amount of a half ether of a glycol to serve as a chain stopper. Such a preparation is illustrated in the following example:

*Example 6*

|  | Parts |
|---|---|
| Diethylene glycol | 101 |
| Beta methoxyethanol | 4 |
| Paraformaldehyde (91%) | 30 |
| Toluene | 20 |
| Sulfuric acid (99%) | 0.1 |

The above materials were reacted as in Example 1 to yield a viscous liquid possessing a faint ethereal odor and soluble in water. Its polymeric nature was shown by Rast molecular weight determination which had a value of 637.

I prefer to react substantially equimolar ratios of the aldehyde to the polyglycol in making my condensation products, but I may also use an excess of either reactant. In forming the condensation products, it is necessary to have a strongly acidic catalyst present, such as sulfuric acid, alkane sulfonic acids, phosphoric acids, and acid halides, such as zinc chloride, stannic chloride, aluminum chloride, acid clays, etc. In general, those catalysts well-known to the art for alkylation, esterification and Friedel-Crafts condensation reactions may be employed in making the condensation products. The condensation products of this invention are of polymeric nature, as illustrated by the molecular weight of the product of Example 1. By polymeric, I mean that my condensation products contain two or more aldehyde units or alkylidene radicals and two or more polyhydric alcohol units or oxyalkylene radicals per molecule of condensation products.

It is preferred to have toluene present as an azeotropic liquid medium which does not interfere with the reaction. Other azeotropic vehicles which may be used are benzene, xylene, ethyl benzene, and the like.

The acetal condensation products made according to this invention may be used in textile finishing, leather treating and paper treating. They may be used as plasticizers, either of water-soluble or organic-soluble polymers. They may be used as hydraulic fluids and lubricants. They may also be used in embalming fluids, germicides, fungicides and similar applications.

I claim:

1. A polymeric condensation product of diethylene glycol and formaldehyde having the following general formula:

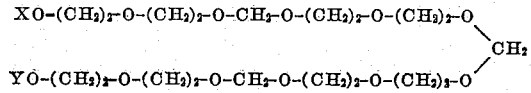

wherein X and Y are selected from the group consisting of H and —CH₂OH.

2. A polymeric acetal condensation product comprising the reaction product of at least one dialkylene glycol in which the alkylene radical has 2 to 4 carbon atoms in a straight chain and at least one aliphatic monoaldehyde containing 1 to 8 carbon atoms, said condensation product containing per molecule at least two dioxyalkylene radicals derived from said dialkylene glycol and at least two alkylidene radicals derived from said aldehyde.

3. A polymeric acetal condensation product comprising the reaction product of at least one dialkylene glycol in which the alkylene radical has 2 to 4 carbon atoms in a straight chain, a polyalkylene glycol in which the alkylene radical has 2 to 3 carbon atoms in a straight chain, and at least one aliphatic monoaldehyde containing 1 to 8 carbon atoms, said condensation product containing per molecule at least two dioxyalkylene radicals derived from said dialkylene glycol and at least two alkylidene radicals derived from said aldehyde.

4. A polymeric acetal condensation product comprising the reaction product of at least one dialkylene glycol in which the alkylene radical has 2 to 4 carbon atoms in a straight chain, an aliphatic polyhydric alcohol containing from 3 to 6 hydroxyl groups and from 3 to 6 carbon atoms, and at least one aliphatic monoaldehyde containing 1 to 8 carbon atoms, said condensation product containing per molecule at least two dioxyalkylene radicals derived from said dialkylene glycol and at least two alkylidene radicals derived from said aldehyde.

5. A polymeric acetal condensation product comprising the reaction product of a dialkylene glycol selected from the group consisting of diethylene glycol, dipropylene glycol and dibutylene glycol, and mixtures thereof, and at least one aliphatic monoaldehyde containing 1 to 8 carbon atoms, said condensation product containing per molecule at least two dioxyalkylene radicals derived from said dialkylene glycol and at least two alkylidene radicals derived from said aldehyde.

6. A polymeric acetal condensation product of diethylene glycol and formaldehyde, said condensation product containing per molecule at least two dioxyalkylene radicals derived from said diethylene glycol and at least two alkylidene radicals derived from said formaldehyde.

7. A polymeric acetal condensation product of diethylene glycol, formaldehyde and glyoxal, said condensation product containing per molecule at least two dioxyalkylene radicals derived from said diethylene glycol and at least two alkylidene radicals derived from said aldehydes.

References Cited in the file of this patent

UNITED STATES PATENTS

| 2,036,304 | Seymour | Apr. 7, 1936 |
| 2,216,799 | Baggett | Oct. 8, 1940 |
| 2,321,094 | MacDowell et al. | June 8, 1943 |
| 2,321,542 | Brooks | June 8, 1943 |